US010697335B2

(12) United States Patent
Rasmussen et al.

(10) Patent No.: US 10,697,335 B2
(45) Date of Patent: Jun. 30, 2020

(54) DIESEL ENGINE BYPASS (OFF-LINE) FILTRATION SYSTEM WITH AUTOMATIC FLOW CONTROL

(71) Applicant: C.C. JENSEN A/S, Svendborg (DK)

(72) Inventors: Brian Rasmussen, Svendborg (DK); Thomas Herdahl-Thorsing, Gislev (DK); Svend Erik Lem, Svendborg (DK)

(73) Assignee: C.C. JENSEN A/S (DK)

( * ) Notice: Subject to any disclaimer, the term of this patent is extended or adjusted under 35 U.S.C. 154(b) by 57 days.

(21) Appl. No.: 15/758,378

(22) PCT Filed: Sep. 19, 2016

(86) PCT No.: PCT/EP2016/072129
§ 371 (c)(1),
(2) Date: Mar. 8, 2018

(87) PCT Pub. No.: WO2017/046413
PCT Pub. Date: Mar. 23, 2017

(65) Prior Publication Data
US 2018/0252127 A1    Sep. 6, 2018

(30) Foreign Application Priority Data

Sep. 17, 2015 (DK) .................................. 2015 70593

(51) Int. Cl.
*F01M 1/16* (2006.01)
*F01M 11/03* (2006.01)
(Continued)

(52) U.S. Cl.
CPC ............. *F01M 1/16* (2013.01); *B01D 35/005* (2013.01); *B01D 37/048* (2013.01); *F01M 1/10* (2013.01);
(Continued)

(58) Field of Classification Search
None
See application file for complete search history.

(56) References Cited

U.S. PATENT DOCUMENTS 5,755,657 A * 5/1998 Millson .................. B04B 5/005
210/360.1
2002/0081923 A1* 6/2002 Artley ...................... B01J 20/26
442/123
(Continued)

FOREIGN PATENT DOCUMENTS

CN 1124322 A 6/1996
CN 203189077 9/2013
(Continued)

*Primary Examiner* — Richard C Gurtowski
(74) *Attorney, Agent, or Firm* — Luedeka Neely Group, PC

(57) ABSTRACT

The present invention relates to an oil filtration system for off-line filtering of contaminated oil from diesel machinery (1), the oil filtration system comprising a system inlet (4) for receiving an inlet flow of contaminated oil from the diesel machinery (1), a system outlet (5) for releasing an outlet flow of filtered oil to the diesel machinery (1), an oil filtration unit which is in fluid communication with the system inlet (4) and the system outlet (5), the oil filtration unit comprising an oil filter (6) which is adapted to receive the contaminated oil and to release the filtered oil, a pumping unit (7) which is arranged upstream of the oil filtration unit, the pumping unit (7) being adapted to provide a flow of contaminated oil in a direction from the system inlet (4) to the oil filtration unit, a temperature sensor (13) for measuring an oil temperature, the temperature sensor (13) comprising a signal transmitter adapted to transmit a first electrical signal reflecting the measured oil temperature, and a control unit (14) adapted to receive the first electrical signal, to compare the measured oil temperature with at least one reference temperature, and to adjust the pumping flow (Continued)

rate of the pumping unit (7) according to the comparison of the measured oil temperature and the at least one reference temperature, where the temperature sensor (13) is positioned upstream from the oil filter (6) in order to measure the oil temperature of the contaminated oil immediately before it is received by the oil filter (6). The invention further relates to a method for off-line filtering of contaminated oil from diesel machinery (1).

16 Claims, 1 Drawing Sheet

(51) Int. Cl.
*B01D 35/00* (2006.01)
*B01D 37/04* (2006.01)
*F01M 1/10* (2006.01)

(52) U.S. Cl.
CPC ..... *F01M 11/03* (2013.01); *F01M 2001/1035* (2013.01); *F01M 2011/035* (2013.01); *F16N 2250/08* (2013.01)

(56) References Cited

U.S. PATENT DOCUMENTS

| | | | |
|---|---|---|---|
| 2004/0226613 A1* | 11/2004 | Ono | F01M 1/16 137/468 |
| 2008/0230317 A1 | 9/2008 | Jen et al. | |
| 2009/0071913 A1 | 3/2009 | Konig et al. | |
| 2011/0284473 A1 | 11/2011 | Kemper | |

FOREIGN PATENT DOCUMENTS

| | | |
|---|---|---|
| DE | 10344665 | 5/2005 |
| GB | 2402720 | 12/2004 |
| GB | 2418873 | 4/2006 |

* cited by examiner

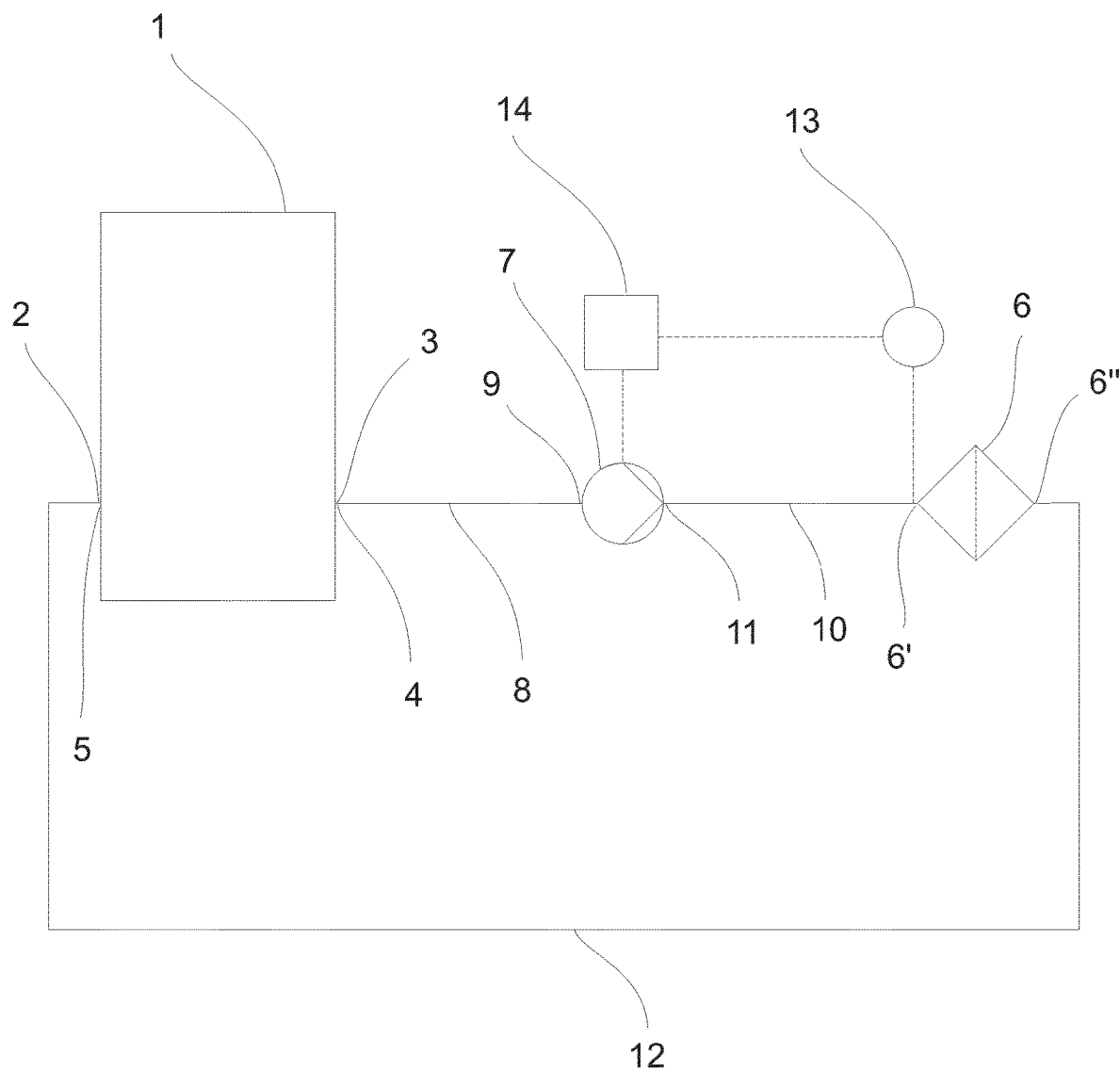

DIESEL ENGINE BYPASS (OFF-LINE) FILTRATION SYSTEM WITH AUTOMATIC FLOW CONTROL

The present invention relates to an oil filtration system for off-line filtering of contaminated oil from diesel machinery, the oil filtration system comprising
- a system inlet for receiving an inlet flow of contaminated oil from the diesel machinery,
- a system outlet for releasing an outlet flow of filtered oil to the diesel machinery,
- an oil filtration unit which is in fluid communication with the system inlet and the system outlet, the oil filtration unit comprising an oil filter which is adapted to receive the contaminated oil and to release the filtered oil,
- a pumping unit which is arranged upstream of the oil filtration unit, the pumping unit being adapted to provide a flow of contaminated oil in a direction from the system inlet to the oil filtration unit,
- a temperature sensor for measuring an oil temperature, the temperature sensor comprising a signal transmitter adapted to transmit a first electrical signal reflecting the measured oil temperature, and
- a control unit adapted to receive the first electrical signal, to compare the measured oil temperature with at least one reference temperature, and to adjust the pumping flow rate of the pumping unit according to the comparison of the measured oil temperature and the at least one reference temperature.

The present invention further relates to a method for off-line filtering of contaminated oil from diesel machinery.

Large diesel engines with a bulk volume of system lubricating oil above 200 litres, require lubrication and cooling, such as lubrication of main and crank bearings and cooling of piston crowns. In order to reduce wear rates on the diesel machinery and to increase time between required service on the lubricating oil and the engine, the lubricating oil requires continuous cleaning in a bypass (off-line) system to obtain optimal cleaning and separation of particle contaminants.

Various types of means for cleaning/filtering may be applied, one of them being a depth filter filtration system. Common to any bypass cleaning/filtering system is that most engine manufactures require the bypass (off-line) cleaning/filtering system to be in operation both when the engine is running and during standstill.

When oil flows through a depth filter insert, a pressure drop will built up across the depth filter insert. This pressure drop is influenced by two main factors, (1) particle contaminants retained and accumulated in the depth filter insert and (2) the viscosity of the oil.

The pressure drop caused by retained particle contaminants (1) is a natural process and is an indication of the condition of the depth filter insert in terms of accumulated contaminants and remaining service life of the depth filter insert.

The pressure drop caused by the viscosity of the oil (2) is temperature-dependent. When the diesel engine is running, the temperature is high (e.g. above 50° C.), and the viscosity is low, and the pressure drop across the depth filter insert is primarily affected/generated by accumulated particle contamination. When the engine is not running, the temperature is low (e.g. below 50° C.), and the viscosity is high, and the pressure drop is primarily affected/generated by the high viscosity which gives a false indication of the condition of the depth filter insert and thus inter alia of the remaining time before service. The mechanical construction of the bypass filtering/cleaning system is also affected/worn due to the inappropriately high pressure drop. To overcome these draw backs, the bypass filtering/cleaning system is normally provided with an energy consuming pre-heater keeping the oil temperature high and the oil viscosity low (i.e. close to normal operating conditions) independent of whether the engine is running or at standstill.

Thus, known oil filtration systems for off-line filtering of contaminated oil from diesel machinery provide an energy consuming solution.

In accordance with the invention, there is provided an oil filtration system for off-line filtering of contaminated oil from diesel machinery, the oil filtration system comprising
- a system inlet for receiving an inlet flow of contaminated oil from the diesel machinery,
- a system outlet for releasing an outlet flow of filtered oil to the diesel machinery,
- an oil filtration unit which is in fluid communication with the system inlet and the system outlet, the oil filtration unit comprising an oil filter which is adapted to receive the contaminated oil and to release the filtered oil,
- a pumping unit which is arranged upstream of the oil filtration unit, the pumping unit being adapted to provide a flow of contaminated oil in a direction from the system inlet to the oil filtration unit,
- a temperature sensor for measuring an oil temperature, the temperature sensor comprising a signal transmitter adapted to transmit a first electrical signal reflecting the measured oil temperature, and
- a control unit adapted to receive the first electrical signal, to compare the measured oil temperature with at least one reference temperature, and to adjust the pumping flow rate of the pumping unit according to the comparison of the measured oil temperature and the at least one reference temperature,
- where the temperature sensor is positioned upstream from the oil filter in order to measure the oil temperature of the contaminated oil immediately before it is received by the oil filter.

A diesel machinery may be understood as being a diesel engine as such, or main bearings, crank bearings, piston crowns, etc. of diesel engines. However, other types of diesel machinery requiring a bulk volume of system oil is foreseen within the present invention.

Contaminated oil from a diesel machinery may be understood as being lubrication oil, cooling oil etc. comprising a solid phase, such as an amount of particle contaminants.

Immediately before may be understood as the temperature sensor being positioned so that it measures an oil temperature close to or equal to the temperature of the oil, when the oil enters the oil filter. Thus, the temperature sensor may be positioned anywhere after the system inlet and before to the oil filter. Thus, the temperature sensor may be positioned to measure the oil temperature at the inlet of the oil filter, and/or positioned closer to the oil filter than to the system inlet, and/or positioned closer to the oil filter than to the pumping unit.

As explained above, when the diesel machinery is running, the oil temperature may be measured to be above a reference temperature (such as above 50° C., but depending on the type and location of the diesel machinery) and the viscosity is low compared to when the diesel machinery is at standstill and the oil temperature may be measured to be below a reference temperature (such as below 50° C.). When the diesel machinery is running, the pressure drop across the oil filter is primarily affected/generated by accumulated particle contamination. When the diesel machinery is at standstill, the pressure drop across the oil filter is primarily affected/generated by the (high) viscosity of the oil which gives a false indication of the condition of the depth filter insert and thus inter alia of the remaining time before the next required service.

Providing a regulation of the pumping flow rate/pumping capacity relative to a comparison of the measured oil temperature and at least one reference temperature, the effect of an increase in the viscosity of the oil on the mechanical construction of the oil filtration system and on the pressure drop across the oil filter may be minimised. Thus, when the diesel machinery is running, a high pumping flow rate may be applied (i.e. normal operation conditions, such as full or close to full pumping flow rate). However, when the diesel machinery is at standstill, the mechanical construction of the oil filtration system may be affected/worn down if a pumping flow rate is used which is similar to the pumping flow rate of a running diesel machinery. Thus, the pumping flow rate may be regulated (i.e. decreased) to minimise the effect of the (high) viscosity, and the alternative of using a preheater to keep the temperature and viscosity of the oil close to normal operating conditions may be avoided.

Thus, at standstill of the diesel machinery, the mechanical construction of the oil filtration system is less effected as e.g. the pumping unit may reduce the pumping flow rate and as the oil filtration unit receives a reduced amount of contaminated oil. Furthermore, as the pumping flow rate is reduced, the energy consumption is reduced.

The degreee of the at least one reference temperature may depend on a number of different parameters such as the type of the oil, the viscosity of the oil, the maximum and minimum temperature, which the oil will experience, the environment in which the diesel machinery is operating, the pressure in the system, the pressure drop across the oil filter, etc. The degree of the at least one reference temperature may be adaptive and may as such change/vary with time according to a change in e.g. operating and/or environmental conditions (e.g. change in type of oil, viscosity, temperature or pressure drop).

Within the present invention, the viscosity of the oil may be between 10 and 800 cSt.

Thus, an energy-efficient solution is provided which reduces wear on the oil filtration system, and which provides a correct indication of the oil filter condition and of the remaining time before the next required service.

During passage of the oil through the oil filter, the temperature of the oil may change due to the pressure drop across the oil filter, and the oil temperature may drop due to heat loss during transport through the tubing to and from the oil filtration unit. Thus, in case the temperature sensor is provided downstream of the oil filtration unit, the measured oil temperature would be different from the temperature of the oil immediately before the oil enters the oil filter. For this reason, an oil temperature measured after the oil filtration unit cannot be used for precisely estimating what the oil temperature is immediately before the oil enters the oil filtration unit and thus the oil filter. This means that such a measured oil temperature cannot be used for optimally regulating the pumping flow rate.

Thus, when providing the temperature sensor upstream of the oil filter, the temperature of the oil is measured before the oil enters the oil filtration unit and thus the oil filter. This results in optimal conditions for regulating the pumping flow rate depending on whether the diesel engine is running or at standstill.

Measuring the oil temperature by use of a temperature sensor provides a solution which is easy to install. Regulating the pumping flow rate by use of a dedicated control unit designed to communicate with the temperature sensor results in that there is no need to interfere with other control systems of the diesel machinery, and in that automatic regulation is provided which means no or minimal manpower is necessary.

Thus, a solution is provided which is easy to install and to operate.

In an embodiment, the temperature sensor can be positioned downstream of the pumping unit.

Positioning the temperature sensor downstream of the pumping unit facilitates that the oil temperature of the contaminated oil may be measured immediately before it is received by the oil filter, thus minimising the risk of the oil temperature changing during passage of oil through the pumping unit and the tubing leading to the oil filtration unit. Thus, the temperature sensor may as such be positioned immediately before the inlet of the oil filtration unit or in the inlet of the oil filtration unit.

In an embodiment, the temperature sensor can be positioned upstream of and in the immediate vicinity of the oil filter.

Providing the temperature sensor upstream of and in the vicinity of the oil filtration unit and of the oil filter has the advantage that the risk of the oil temperature changing between the temperature sensor and the oil filter is minimised.

The temperature sensor may be arranged inside and/or form a part of the oil filtration unit. For example, the oil filtration unit may comprise a housing and an oil filter arranged inside the housing such that the temperature sensor may be installed inside said housing, e.g. in the tubing leading to the oil filter, or may be installed in the inlet of the oil filter which would lead to a more precise measurement the oil temperature received by the oil filter. Thus, the temperature sensor may form part of the oil filtration unit and may therefore be installed simultaneously with the oil filtration unit so that the no extra manpower has to be used for installing the temperature sensor with the risk of the temperature sensor being installed incorrectly.

Thus, an optimal temperature measurement is provided.

In an embodiment, the oil filter can comprise natural or synthetic polymer. In an embodiment, the oil filter can be a depth fine filter. Thus, the oil filter may comprise a cellulose material. The inventors have found that a depth fine filter comprising natural or synthetic polymer is advantageous as filtering material in the present invention.

In an embodiment, the pumping unit can be a positive displacement pump. Thus, the pumping unit may pump a constant amount of fluid (oil) for each revolution. The pumping unit is arranged upstream of the oil filtration unit, and may therefore be arranged between the system inlet and the oil filtration unit. The pumping unit provides a flow of contaminated oil, and thus moves/translates/displaces a volume of contaminated oil in a direction from the system inlet to the oil filtration unit.

The positive displacement pump may as such be a rotary-type positive displacement, reciprocating-type positive displacement or linear-type positive displacement pump.

The positive displacement pump may be driven by an electric motor so that when regulating/adjusting the pumping flow rate, the revolution rate of the electric motor of the pump is regulated/adjusted.

Thus, the positive displacement pump may be an internal gear pump.

In an embodiment, the pumping flow rate of the pumping unit can be between 100 L/h and 10,000 l/h.

In an embodiment, the oil temperature can be between 10° C. and 150° C.

In accordance with the invention, there is further provided a method for off-line filtering of contaminated oil from diesel machinery, the method comprising the steps of
- providing an oil filtration system comprising
  - a system inlet and a system outlet,
  - an oil filtration unit which is in fluid communication with the system inlet and the system outlet, the oil filtration unit comprising an oil filter, and
  - a pumping unit which is arranged upstream of the oil filtration unit,
- receiving an inlet flow of contaminated oil from the diesel machinery through the system inlet,
- pumping the inlet flow of contaminated oil in a direction from the system inlet to the oil filtration unit by use of the pumping unit,
- measuring an oil temperature of the contaminated oil immediately before it is received by the oil filter and transmitting a first electrical signal reflecting the measured oil temperature by use of a temperature sensor which comprises a signal transmitter and is positioned upstream from the oil filter,
- introducing the contaminated oil to the oil filter, so that the contaminated oil is filtered, and releasing said filtered oil from the oil filter,
- comparing the measured oil temperature with at least one reference temperature, and adjusting a pumping flow rate of the pumping unit in accordance with the comparison of the measured oil temperature and the at least one reference temperature, by use of a control unit, and
- releasing an outlet flow of filtered oil to the diesel machinery through the system outlet.

In an embodiment, the pumping flow rate can be reduced, increased or maintained in accordance with the comparison of the measured oil temperature and the at least one reference temperature.

The measured oil temperature may be compared with at least one reference temperature. In case the measured oil temperature is compared with only one reference temperature, the reference temperature may be determined so as to indicate whether the diesel machinery is running/operated or at standstill. Said reference temperature may e.g. be 50° C.

Thus, if the comparison shows that the measured oil temperature is below the reference temperature, this may indicate that the diesel machinery is at standstill and that the viscosity of the oil has increased for which reason the pumping flow rate may be reduced, e.g. to 30% or 50% of full flow rate of the pumping unit. If the comparison shows that the measured oil temperature is above the reference temperature, this may indicate that the diesel machinery is running and that the viscosity of the oil has decreased for which reason the pumping flow rate may be increased to normal operation conditions, e.g. to 100% of full flow rate of the pumping unit.

If the comparison shows that the measured oil temperature is above the reference temperature, but that the pumping flow rate has already been increased to normal operating conditions, the pumping flow rate may be maintained, and vice versa. This provides an easy and effective adjustment/regulation of the pumping flow rate relative to the oil temperature and thus to the viscosity of the oil.

The measured oil temperature may be compared to more than one reference temperature so that the pumping flow rate may be adjusted to more pumping flow rates than a high (e.g. 100% of full flow rate) and a low value (e.g. 30% of full flow rate), such as also to one or more intermediate values (e.g. 50% or 60% of full flow rate). This would inter alia further minimise the wear/stress on the mechanical construction of the oil filtration system.

It may be defined as a requirement that two or more comparisons (of measured and reference temperatures) must indicate that the measured oil temperature is below or above a reference temperature before the pumping flow rate may be adjusted/regulated. This would prevent the pumping flow rate from being adjusted/regulated repeatedly in case the measured oil temperature is fluctuating relative to a reference temperature and would thus spare the mechanical construction of the oil filtration system, and possibly decrease energy consumption.

In an embodiment, the pumping flow rate can be reduced or increased with a constant rate.

Thus, the pumping flow rate may be reduced or increased with a constant ramping rate such as between 0.1% per second and 20% per second so that the pumping flow rate is not adjusted/regulated instantaneously. This will reduce the wear on the mechanical construction of the pumping unit and of the oil filtration unit as the operational conditions are not changed rapidly.

In an embodiment, the pumping flow rate can be reduced or increased instantaneously.

Thus, the pumping flow rate may be reduced or increased stepwise, such as e.g. between 33%, 66% and 100% of full pumping flow rate (where 100% of full pumping flow rate may be normal operating conditions). This may be advantageous if an immediate higher rate of oil filtering is required, e.g. when the diesel machinery starts running after a period of standstill.

The structure and function of the oil filtration system and the method of using it will be described in more detail below with references to exemplary embodiments shown in the drawing wherein, FIG. 1 shows an embodiment of the oil filtration system connected to a diesel machinery.

The diesel machinery 1 may comprise a machinery inlet 2 and a machinery outlet 3 to e.g. an oil sump of the diesel machinery 1 comprising an amount of contaminated oil, which requires cleaning/filtering. The contaminated oil may have a temperature between 10° C. to 150° C. depending on whether the diesel machinery is running or at standstill and on the location of the diesel machinery.

The oil filtration system may be connected to said machinery inlet 2 and machinery outlet 3 of the diesel machinery 1 with a system inlet 4 and a system outlet 5, respectively, so that the oil filtration system may receive an inlet flow of the contaminated oil from the diesel machinery 1 and release an outlet flow of filtered oil to the diesel machinery 1.

The oil filtration system may comprise an oil filtration unit comprising an oil filter 6 such as a depth fine filter, which is adapted to receive the contaminated oil and release filtered oil, and may comprise a pumping unit 7.

Tubing 8 may connect the system inlet 4 to a pumping inlet 9 of the pumping unit 7, and tubing 10 may connect a pumping outlet 11 of the pumping unit 7 to an inlet of the oil filtration unit and to an inlet 6' of the oil filter 6. Moreover, tubing 12 may connect an outlet of the oil filtration unit and an outlet 6" of the oil filter 6 to the system outlet 5. Thus, the oil filtration unit and the oil filter 6 may thus be in fluid communication with the system inlet 4 and system outlet 5.

The pumping unit 7 may be arranged upstream of the oil filtration unit and of the oil filter 6 so that the pumping unit may provide a flow of contaminated oil in a direction from the system inlet 4 to the oil filtration unit and the oil filter 6 and may provide a flow of filtered oil in a direction from the outlet 6″ of the oil filter 6 and thus of the oil filtration unit to the system outlet 5.

The pumping unit 7 may be a positive displacement pump such as a rotary-type positive displacement, reciprocating-type positive displacement or linear-type positive displacement pump, and may be an internal gear pump. The pumping unit 7 may provide a pumping flow rate of between 100 L/h to 10,000 L/h.

The oil filtration system may further comprise a temperature sensor 13 for measuring an oil temperature and a control unit 14, where the temperature sensor 13 and the control unit 14 may be adapted to communicate with each other e.g. by cable or wirelessly. The temperature sensor 13 may comprise a signal transmitter which is adapted to transmit a first electrical signal reflecting a measured oil temperature. The control unit 14 may be adapted to receive and interpret the first electrical signal transmitted from the signal transmitter, to compare a measured oil temperature with at least one reference temperature, and to adjust/regulate the pumping flow rate of the pumping unit according to the comparison of the measured oil temperature and the at least one reference temperature. It is understood that the pumping unit 7 may comprise the control unit 14.

The temperature sensor 13 may be positioned anywhere downstream of the system inlet 4 and be before/upstream of the oil filter 6. Thus, the temperature sensor 13 may be positioned upstream from the oil filter and/or upstream of the oil filtration unit in order to measure the oil temperature of the contaminated oil immediately before it is received by the oil filter 6. In FIG. 1, the temperature sensor 13 is illustrated as being positioned so as to measure the temperature of the oil at a position immediately before the oil filter 6.

The temperature sensor 13 may be arranged to measure the oil temperature either upstream or downstream of the pumping unit 7. Advantageously, the oil temperature is measured at a position so that a similar temperature to the oil immediately before being received by the oil filter 6 is measured.

The oil filtration system may be operated by receiving an inlet flow of contaminated oil from the diesel machinery 1 through the system inlet 4 and pumping the inlet flow of contaminated oil in a direction from the system inlet 4 to the oil filtration unit by use of the pumping unit 7. The oil temperature of the contaminated oil may be measured constantly or with a predetermined rate with the temperature sensor 13 at a position upstream of the oil filter 6 so that the oil temperature is measured immediately before the oil is received by the oil filter 6. On the basis of the measured temperature, a first electrical signal reflecting the measured oil temperature may be transmitted with the signal transmitter of the temperature sensor 13. The contaminated oil may be introduced to the oil filter 6, so that the contaminated oil is filtered and released to the tubing 12, which connects the outlet 6″ of the oil filter 6 to the system outlet 5, so that an outlet flow of filtered oil is provided to the diesel machinery 1. The control unit 14 may compare the measured oil temperature with at least one reference temperature, and adjust/regulate the pumping flow rate of the pumping unit 7 accordingly. The control unit 14 may adjust/regulate the pumping flow rate with a constant/linear ramping rate such as between 0.1% per second and 20% per second to reduce the wear on the mechanical construction of the pumping unit 7 or may adjust/regulate the pumping flow rate in steps, such as e.g. between 33%, 66% and 100% of full pumping flow rate (where 100% of full pumping flow rate may be normal operating conditions) to facilitate a demand of an immediate higher/lower pumping flow rate.

Modifications and combinations of the above principles and designs are foreseen within the scope of the present invention.

The invention claimed is:

1. An oil filtration system for off-line filtering of contaminated oil from diesel machinery, the oil filtration system comprising:
   a system inlet for receiving an inlet flow of contaminated oil from the diesel machinery;
   a system outlet for releasing an outlet flow of filtered oil to the diesel machinery;
   an oil filtration unit which is in fluid communication with the system inlet and the system outlet, the oil filtration unit comprising an oil filter which is a fine filter and is adapted to receive the contaminated oil and to release the filtered oil;
   a pumping unit which is arranged upstream of the oil filtration unit, the pumping unit being adapted to provide a flow of contaminated oil in a direction from the system inlet to the oil filtration unit;
   a temperature sensor for measuring an oil temperature, the temperature sensor comprising a signal transmitter adapted to transmit a first electrical signal reflecting the measured oil temperature; and
   a control unit adapted to receive the first electrical signal, characterised in that
   the oil filtration system is adapted to be operated both when the diesel machinery is running and at standstill,
   the control unit is adapted to compare the measured oil temperature with at least one reference temperature and to adjust the pumping flow rate of the pumping unit according to the comparison of the measured oil temperature and the at least one reference temperature, so that if the measured oil temperature is below the at least one reference temperature, the pumping flow rate of the pumping unit is at a low flow rate and if the measured oil temperature is above the at least one reference temperature, the pumping flow rate of the pumping unit is at a normal flow rate, and in that
   the temperature sensor is positioned to measure the oil temperature of the contaminated oil before it is received by the oil filter.

2. The oil filtration system according to claim 1, wherein the temperature sensor is positioned downstream of the pumping unit.

3. The oil filtration system according to claim 1 wherein the temperature sensor is positioned upstream of and in the immediate vicinity of the oil filter.

4. The oil filtration system according to claim 1 wherein the oil filter comprises natural or synthetic polymer.

5. The oil filtration system according to claim 1 wherein the pumping unit is a positive displacement pump.

6. The oil filtration system according to claim 1 wherein the pumping flow rate of the pumping unit is between 100 L/h and 10,000 L/h.

7. The oil filtration system according to claim 1 wherein the oil temperature is between 10° C. and 150° C.

8. A method for off-line filtering of contaminated oil from diesel machinery, the method comprising the steps of:
   providing an oil filtration system which is adapted to be operated both when the diesel machinery is running and at standstill, the oil filtration system comprising
   a system inlet and a system outlet, an oil filtration unit which is in fluid communication with the system inlet and the system outlet, the oil filtration unit comprising an oil fine filter, and a pumping unit which is arranged upstream of the oil filtration unit;

receiving an inlet flow of contaminated oil from the diesel machinery through the system inlet;

pumping the inlet flow of contaminated oil in a direction from the system inlet to the oil filtration unit by use of the pumping unit;

measuring an oil temperature of the contaminated oil at an inlet of the oil filter and transmitting a first electrical signal reflecting the measured oil temperature, by use of a temperature sensor which comprises a signal transmitter and is positioned upstream from the oil filter;

introducing the contaminated oil to the oil filter, so that the contaminated oil is filtered, and releasing said filtered oil from the oil filter;

comparing the measured oil temperature with at least one reference temperature, and maintaining a pumping flow rate of the pumping unit at a normal flow rate if the measured oil temperature is above the at least one reference temperature and providing a low pumping flow rate of the pumping unit if the measure oil temperature is below the at least one reference temperature, by use of a control unit; and releasing an outlet flow of filtered oil to the diesel machinery through the system outlet.

9. The method according to claim 8, wherein the pumping flow rate is reduced, increased or maintained in accordance with the comparison of the measured oil temperature and the at least one reference temperature.

10. The method according to claim 8 wherein the pumping flow rate is reduced or increased with a constant rate of change.

11. The method according to claim 8 wherein the pumping flow rate is reduced or increased instantaneously.

12. The method according to claim 8, wherein the control unit is a dedicated control unit, the dedicated control unit communicating with the temperature sensor measurements to control the pumping flow rate of the pumping unit.

13. The oil filtration system according to claim 1, wherein the control unit is a dedicated control unit for communicating with the temperature sensor measurements to control the pumping flow rate of the pumping unit.

14. An oil filtration system for filtering of contaminated oil from diesel machinery, the oil filtration system comprising:

a system inlet for receiving an inlet flow of contaminated oil from the diesel machinery;

a system outlet for releasing an outlet flow of filtered oil to the diesel machinery;

an oil filtration unit which is in fluid communication with the system inlet and the system outlet, the oil filtration unit comprising an oil filter which is a fine filter and is adapted to receive the contaminated oil and to release the filtered oil;

a pumping unit which is arranged upstream of the oil filtration unit, the pumping unit being adapted to provide a flow of contaminated oil in a direction from the system inlet to the oil filtration unit;

a temperature sensor for measuring an oil temperature, the temperature sensor comprising a signal transmitter adapted to transmit a first electrical signal reflecting the measured oil temperature; and a control unit adapted to receive the first electrical signal, characterised in that the oil filtration system is adapted to be operated both when the diesel machinery is running and at standstill, the control unit is adapted to compare the measured oil temperature with at least one reference temperature and to adjust the pumping flow rate of the pumping unit according to the comparison of the measured oil temperature and the at least one reference temperature, and in that the temperature sensor is positioned to measure the oil temperature of the contaminated oil before it is received by the oil filter, wherein the oil filtration system is devoid of an oil heater or cooler.

15. The oil filtration system according to claim 14, wherein the temperature sensor is positioned downstream of the pumping unit.

16. The oil filtration system according to claim 14, wherein the temperature sensor is positioned upstream of and in the immediate vicinity of the oil filter.

* * * * *